(12) United States Patent
Furukawa et al.

(10) Patent No.: US 8,531,718 B2
(45) Date of Patent: Sep. 10, 2013

(54) IMAGE FORMING DEVICE HAVING OPERATING INFORMATION MANAGING FUNCTION

(75) Inventors: Kunio Furukawa, Toyokawa (JP); Mikiyuki Aoki, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 574 days.

(21) Appl. No.: 12/768,127

(22) Filed: Apr. 27, 2010

(65) Prior Publication Data

US 2010/0284032 A1 Nov. 11, 2010

(30) Foreign Application Priority Data

May 11, 2009 (JP) .................................. 2009-114161

(51) Int. Cl.
*G06K 15/00* (2006.01)
(52) U.S. Cl.
USPC ........ 358/1.16; 358/1.14; 358/1.15; 318/362; 318/376
(58) Field of Classification Search
USPC ................. 358/1.1–1.9, 1.11–1.16; 318/362, 318/376
See application file for complete search history.

(56) References Cited

U.S. PATENT DOCUMENTS

| 5,835,107 | A  | * | 11/1998 | Suzuki et al. | 347/19 |
| 6,516,440 | B1 | * | 2/2003  | Teradaira     | 714/763 |
| 7,171,186 | B2 | * | 1/2007  | Miyachi et al.| 455/343.5 |
| 7,342,675 | B2 | * | 3/2008  | Jamison et al.| 358/1.14 |
| 8,390,220 | B2 | * | 3/2013  | Underhill     | 318/376 |

FOREIGN PATENT DOCUMENTS

| JP | 63-120351   | 5/1988 |
| JP | 4-195697    | 7/1992 |
| JP | 6-20381     | 1/1994 |
| JP | 9-185004    | 7/1997 |
| JP | 2002-359970 | 12/2002 |
| JP | 2005-278348 | 10/2005 |
| JP | 2005-335275 | 12/2005 |
| JP | 2007-178639 | 7/2007 |
| JP | 2007-306673 | 11/2007 |
| JP | 2008-5105   | 1/2008 |
| JP | 2008-129096 | 6/2008 |
| JP | 2008-180893 | 8/2008 |
| JP | 2008-219173 | 9/2008 |
| JP | 2009-20366  | 1/2009 |
| JP | 2009-94623  | 4/2009 |

OTHER PUBLICATIONS

Japanese Office Action mailed Apr. 26, 2011, directed towards counterpart JP App. No. 2009/114161; 5 pages.

* cited by examiner

*Primary Examiner* — Benny Q Tieu
*Assistant Examiner* — Michael Y Tzeng
(74) *Attorney, Agent, or Firm* — Morrison & Foerster LLP

(57) ABSTRACT

An image forming device includes a power source unit, motors supplied with and driven by electric power from the power source unit, and a control device for controlling the motors' operations. A CPU in the control device monitors presence/absence of power supply from the power source unit. When power is cut off during image forming, the CPU causes regenerative braking of the motors. The regenerated power is voltage-converted by a second DC-DC converter in the power source unit and supplied to the control device for continuously driving the CPU, which in turn backs up operating information. This eliminates inconsistency between the actual life status and the backed-up information when power is off, with no need of frequent backup during image forming. It is thus possible to provide the image forming device which can reliably manage operating information even if power supply to the motors is stopped during printing.

13 Claims, 8 Drawing Sheets

IMAGE FORMING DEVICE HAVING OPERATING INFORMATION MANAGING FUNCTION

This application is based on Japanese Patent Application No. 2009-114161 filed with the Japan Patent Office on May 11, 2009, the entire content of which is hereby incorporated by reference.

BACKGROUND OF THE INVENTION

1. Field of the Invention

The present invention relates to an image forming device, and more particularly to an image forming device which has a function of managing operating information.

2. Description of the Related Art

In image forming devices which form (i.e. print) images on sheets of paper (such as a multi function peripheral (MFP) provided with the scanner function, facsimile transmitting/receiving function, copying function, function as a printer, data communicating function, and server function, a facsimile machine, a copier, a printer, and the like), motors are used to generate driving force for use in image formation. The motors may include, for example, a motor which drives rollers transporting a sheet of paper, a motor which drives a print engine unit, and others.

FIG. 8 is a block diagram showing, by way of example, the circuit configuration of a drive system in a conventional image forming device.

The image forming device includes a power source unit (low-voltage power source unit) 800, a drive unit 810, and a control unit 820. Drive unit 810 and control unit 820 are driven by electric power supplied from power source unit 800.

Power source unit 800 is driven by commercial power supply input from a power plug 801. Power source unit 800 includes a main power switch 803, a rectifying unit 805, and a DC-DC converter 807. Main power switch 803 switches between on/off of input of AC power supply. Power source unit 800 converts the input alternating current to direct current at rectifying unit 805, and coverts the voltage of the direct current at DC-DC converter 807 for output. DC-DC converter 807 outputs a voltage of 24 V DC to drive unit 810, and outputs a voltage of 3.3 V DC to control unit 820.

Drive unit 810 has motors 811-815. Motors 811-815 supply driving force for use in a paper transporting operation and other printing operations. Motors 811-815 are each supplied with the direct current output from DC-DC converter 807 and driven under the control instructions from control unit 820.

Control unit 820 includes a control device 821 and a non-volatile memory 823. Control device 821 communicates with non-volatile memory 823 to read control programs therefrom and write data thereto, for control of drive unit 810 and other sites in the image forming device.

Control device 821 performs management of operating information of the image forming device. Such management of the operating information includes life management for a consumable product 830 such as a toner cartridge. The management of the operating information is performed for example in the following manner. Control device 821 backs up the operating information in non-volatile memory 823 or in a non-volatile memory 831 provided within consumable product 830. The operating information backup process is performed every time a predetermined number of times of printing are finished. The operating information may be a count value of the total number of printouts which is obtained by summing up the number of times of printing. When the count value as the operating information has reached a predetermined reference value, control device 821 determines that the life of that consumable product 830 is over.

When such a backup process is performed frequently (every time one page is printed, for example), the processing load on control device 821 increases. On the other hand, when the backup process is performed every time one job is finished, for example, the processing load on control device 821 may be decreased. Reduction of the processing load exerted on control device 821 allows use of an inexpensive device for control device 821. This can also reduce the electric power consumed by the image forming device.

Document 1 below discloses an image forming device which, when a main power switch is turned off, provides a display attracting a user's attention with LEDs or buzzer on a display unit in the device. For providing the attention-attracting display, the image forming device uses counter electromotive force by a polygon motor which keeps rotating due to inertia, to thereby cause the polygon motor to stop earlier. Furthermore, by providing the attention-attracting display, the image forming device prevents vibration or shock from being applied to the device until the polygon motor is stopped. Accordingly, the image forming device prevents damages to the polygon mirror unit.

Document 2 below discloses an image forming device in which a secondary battery is charged with counter electromotive force or regenerative electric power in an actuator such as a motor. When starting a motor or the like, the image forming device causes the secondary battery to operate as an auxiliary electric power source, thereby reducing the load on the AC power line. The image forming device can efficiently charge the secondary battery with the regenerative electric power and the like.

[Document 1] Japanese Patent Application Laid-Open No. 9-185004

[Document 2] Japanese Patent Application Laid-Open No. 2007-178639

In the image forming devices as described above, electric power supply to a motor may be stopped for example when a main power supply is turned off or when electric power supply to the image forming device is stopped due to a power failure or the like. When the electric power supply to the motor is cut off during printing, the motor is stopped and, thus, the operation is stopped in the middle of the image forming operation. For example, in the image forming device having the circuit configuration as described above in conjunction with FIG. 8, when electric power supply from the commercial power supply is stopped due to a power failure or the like or when the supply from the commercial power supply is cut off as main power switch 803 is turned off, the DC voltage is no longer output from power source unit 800 to drive unit 810 and control unit 820. This causes motors 811-815 to stop, because they are driven by the voltage of 24 V DC supplied from power source unit 800. Similarly, control unit 820 stops operating, because the voltage of 3.3 V DC is no longer supplied thereto. As a result, no driving force is provided from motors 811-815, and no control is performed by control unit 820, whereby the image forming device stops operating.

When the image forming device stops operating as described above, the process for backing up the operating information suffers the following problems. Life management of consumable product 830 will now be described by way of example. During the image forming operation, toner is consumed and a photoreceptor wears or deteriorates due to mechanical stress and the like, so that the life status of each component changes constantly. In the case where the operating information (i.e. life information) recorded on non-volatile memory 831 is supposed to be updated upon completion of each job, for example, if power supply from the electric power source is stopped during the image forming operation, the life information backed up in non-volatile memory 831 may become different from the actual life status. That is, when power supply from the electric power source is cut off in the middle of the operation, any change in life status from when the operating information was lastly updated to when the electric power supply is cut off would not be reflected to the life information stored in non-volatile memory 831.

As the number of times of cutoff of the power supply from the electric power source increases, the difference between the life information being backed up and the actual life status increases cumulatively. As a result, consumable product 830 of which life has actually expired may be determined that it has not yet reached the end of the life on the basis of the backed-up life information. In this case, consumable product 830 is used beyond its life, hindering appropriate formation of images.

If the life information is updated frequently, the above-described error will become small. This however leads to increased processing burden on control device 821, as described above. If an electrical storage device such as a battery or a capacitor is provided so as to use the electric power supplied therefrom for updating the life information, the error as described above will not occur. This however increases the manufacturing cost of the image forming device.

Furthermore, the reference value used for determination of life may be set to have a large margin with respect to the actual life, taking the above-described error into consideration. This ensures that consumable product 830 is used within its actual life, even in the presence of the error as described above. Setting such a large margin for the life reference value, however, raises the need to produce consumable product 830 having a life longer than the reference value, which increases the manufacturing cost of consumable product 830.

This problem will now be described by giving a photoreceptor as a specific example of consumable product 830. For management of the life status of the photoreceptor, the rotation time of the photoreceptor is stored in its non-volatile memory 831. The rotation time of the photoreceptor is the life information and the operating information for the photoreceptor. When main power switch 803 is turned off or a power failure takes place, the change in status from when the life information was lastly written will not be reflected to the life information. Thus, it is preferable that the information is written into non-volatile memory 831 at shorter intervals. Writing at such shorter intervals, however, increases the processing load on control device 821. Accordingly, in the practical life management, the rotation time of the photoreceptor is backed up in non-volatile memory 831 every time it rotates for 60 seconds, for example.

In such a case that the backup process is conducted for every 60 seconds of rotation, assume that power supply from the electric power source is cut off as described above, while the image forming device is operating, after a lapse of 30 seconds from the previous backup operation. In this case, the photoreceptor's rotation time which is being backed up in non-volatile memory 831 becomes 30 seconds shorter than the actual driving amount of the photoreceptor. If such an error is accumulated repeatedly, the error therebetween becomes large.

For example, suppose that the photoreceptor has a life (i.e. driving time) of 2,000 minutes. Assuming that one page can be printed with six seconds of driving, 20,000 pages may be printed within the life. This numerical value is written in a product catalog, for example. Assuming that 100 pages are printed each day, the photoreceptor is driven 10 minutes per day. In this use environment, if the cutoff of the electric power supply that would cause an error in driving amount of 30 seconds occurs once every day, the actual driving amount of the photoreceptor becomes greater by 5%.

In the case where a margin is set for the life reference value taking such an error into consideration as described above, when the actual life is 20,000 pages, the life reference value needs to be set to about 19,000 pages. In other words, in order to secure 20,000 pages as the life reference value, it is necessary to use a photoreceptor that can actually last for the number of pages increased by 5%, or 21,000 pages. This eventually increases the manufacturing cost of the photoreceptor.

The problem as described above not only occurs in life management, but commonly occurs in management of the operating information for control of the image forming device. That is, when power supply from the electric power source is cut off as described above, there occurs an error between the actual operating status and the operating information backed up in the non-volatile memory. Such an error may cause malfunction, and increase the cost for preventing the same.

Neither Document 1 nor Document 2 above discloses any effective solution to such a problem that the operating information differs from the actual operating status.

SUMMARY OF THE INVENTION

The present invention has been accomplished to solve the above problems, and an object of the present invention is to provide an image forming device which is able to reliably manage operating information even if electric power supply is cut off during printing.

In order to achieve the above object, according to an aspect of the present invention, an image forming device includes: at least one motor; a non-volatile memory into which information can be written; a writing unit to write into the non-volatile memory operating information within the image forming device at a predetermined time; an electric source power supplying unit to supply electric power, supplied from an electric power source, to the writing unit; a regenerative unit to take regenerative electric power out of the motor, the regenerative electric power being generated until the motor stops; and a regenerative electric power supplying unit, when the electric power is no longer supplied from the electric source power supplying unit, to supply the regenerative electric power taken out of the motor by the regenerative unit to the writing unit, so as to cause the writing unit to perform writing into the non-volatile memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image forming device according to various embodiments of the present invention will be described below.

An image forming device includes printing functions through which a sheet of paper or the like is transported by rollers and printing is performed on that sheet or the like using an electrophotographic method.

[First Embodiment]

Figure 1:
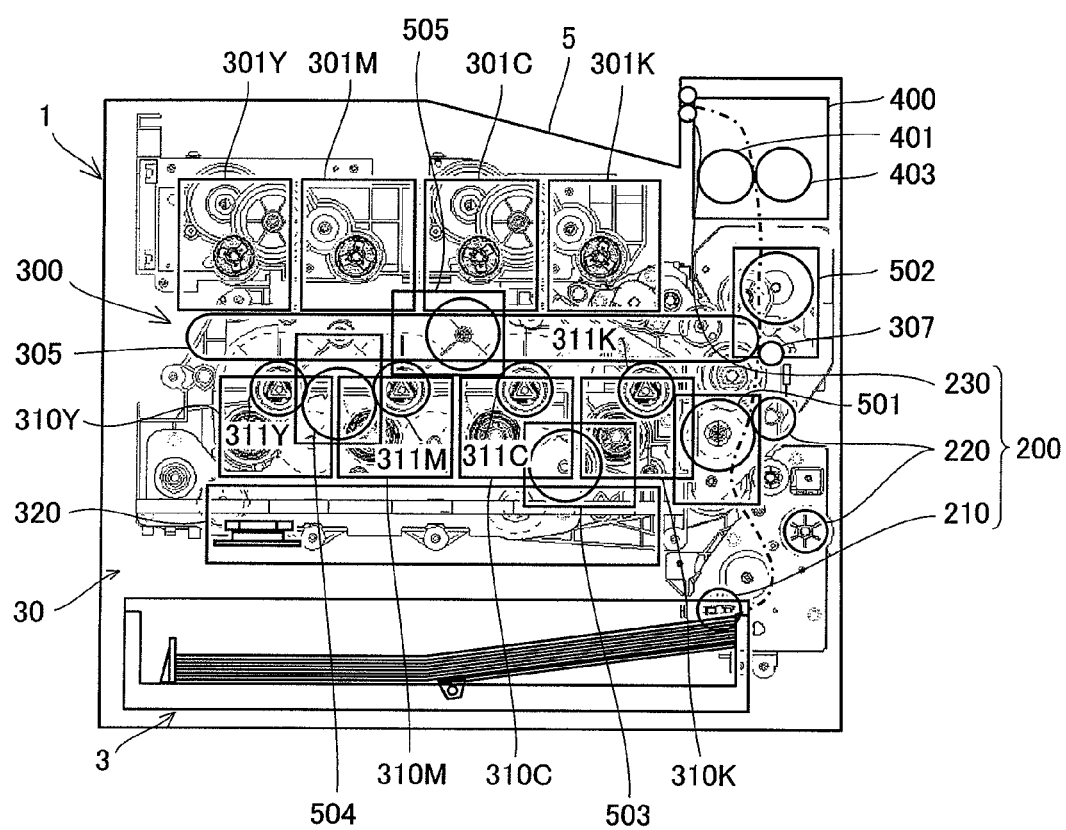
FIG. 1 is a side view showing the hardware configuration of an image forming device according to a first embodiment of the present invention.

Referring to FIG. 1, an image forming device 1 includes a paper cassette 3, a catch tray 5, and a printing unit 30.

Paper cassette 3 is disposed at a bottom part of image forming device 1 and is removable from the housing of image forming device 1. During printing, a sheet loaded into a paper cassette 3 is fed into a sheet transporting path of the device from paper cassette 3, one by one, and is moved to printing unit 30. It should be noted that more than one paper cassette 3 may be provided.

Catch tray 5 is disposed on top of the housing of image forming device 1. A sheet on which an image has been formed by printing unit 30 is discharged from inside the housing to catch tray 5.

Printing unit 30 is disposed within the housing of image forming device 1. Printing unit 30 generally includes a paper transport unit 200, a toner image forming unit (an example of a recording unit) 300, a fixing device 400, and a drive unit (shown in FIG. 2) 500. Printing unit 30 is configured to combine images in four different colors, i.e. C, M, Y, and K, using a so-called tandem method, thereby forming a color image on a sheet.

Paper transport unit 200 is composed of a feed roller 210, a transport roller 220, a discharge roller 230, and other components. Transport roller 220 and discharge roller 230 each transport a sheet, in which two opposite rollers, for example, that sandwich the sheet are rotated. Feed roller 210 feeds one sheet at a time from paper cassette 3. The sheet is fed into the sheet transporting path in the housing of image forming device 1 by feed roller 210. Transport roller 220 transports the sheet fed by feed roller 210 to toner image forming unit 300. Further, transport roller 220 transports the sheet that has passed fixing device 400 to discharge roller 230. Discharge roller 230 discharges the sheet that has been transported by transport roller 220 to the outside of the housing of image forming device 1. It should be noted that paper transport unit 200 may include other rollers used to transport a sheet or for other purposes.

Toner image forming unit 300 is composed of four toner bottles 301Y, 301M, 301C, and 301K for different colors (also referred to as toner bottles 301), an intermediate transfer belt 305, a transfer roller 307, four development units 310Y, 310M, 310C, and 310K (also referred to as development units 310), a laser scanning unit 320, and other components.

Yellow toner bottle 301Y, magenta toner bottle 301M, cyan toner bottle 301C, and black toner bottle 301K store yellow (Y), magenta (M), cyan (C), and black (K) toners, respectively.

Intermediate transfer belt 305 forms a loop and is laid around two rollers (not shown). Intermediate transfer belt 305 is rotated in a synchronized manner with paper transport unit 200. Transfer roller 307 is positioned facing the portion of intermediate transfer belt 305 that is in contact with one roller. The distance between transfer roller 307 and intermediate transfer belt 305 is regulated by a pressing/separating mechanism. A sheet is sandwiched between and transported by intermediate transfer belt 305 and transfer roller 307.

A development unit 310 includes a photoreceptor drum 311, a development device, a cleaner, an electrifying device, and other components. Photoreceptor drum 311 refers to photoreceptor drums 311Y, 311M, 311C, and 311K which are provided respectively for development units 310Y, 310M, 310C, and 310K. Yellow development unit 310Y, magenta development unit 310M, cyan development unit 310C, and black development unit 310K are arranged so as to form Y, M, C, and K images, respectively. Development units 310 are arranged side by side directly below intermediate transfer belt 305. Laser scanning unit 320 is located so that it can scan photoreceptor drums 311 with a laser beam.

In toner image forming unit 300, laser scanning unit 320 forms a latent image on photoreceptor drums 311, which have been electrified in a unified manner by the electrifying device, based on image data for colors Y, M, C, and K. The development device forms toner images in different colors on their respective photoreceptor drums 311. Photoreceptor drums 311 transfer the toner images onto intermediate transfer belt 305 to form, on intermediate transfer belt 305, a mirror image of the toner image that is to be formed on the sheet (primary transfer). Then, transfer roller 307, to which a high voltage has been applied, transfers the toner image formed on intermediate transfer belt 305 onto the sheet, thereby forming a toner image on the sheet (secondary transfer).

When a development unit 310 runs short of toner following image forming, toner kept in the corresponding one of toner bottles 301 is supplied to that development unit to enable continuous image forming.

Fixing device 400 has a heating roller 401 and a pressure roller 403. Fixing device 400 transports a sheet, on which a toner image is formed, by means of heating roller 401 and pressure roller 403 that work together to sandwich the sheet, and heats and presses it together. In this way, fixing device 400 melts the toner adhering to the sheet and fixes it on the sheet, thereby forming an image on the sheet. The sheet that has passed fixing device 400 is discharged by discharge roller 230 from the housing of image forming device 1 onto catch tray 5.

Drive unit 500 has, for example, a main motor (an example of a motor) 501, a fixing motor (an example of the motor) 502, a black development motor (an example of the motor) 503, a color development motor (an example of the motor) 504, and a color photoreceptor motor (an example of the motor) 505 (all of these motors may also be referred to as motors 501-505 or the like). Drive unit 500 is driven under the control of CPU 21, as will be described below. Main motor 501 enables sheet transporting, from the feeding step to the transfer step, and drives intermediate transfer belt 305 and black photoreceptor drum 311K. Fixing motor 502 drives fixing device 400. Black development motor 503 drives black development unit 310K. Color development motor 504 drives yellow, magenta, and cyan development units 310Y, 310M, and 310C. Color photoreceptor motor 505 drives yellow, magenta, and cyan photoreceptor drums 311Y, 311M, and 311C. Besides motors 501-505, a pressing/separating motor for changing pressure in holding the sheet in transfer roller 307 or fixing device 400, for example, may be provided.

Figure 2:
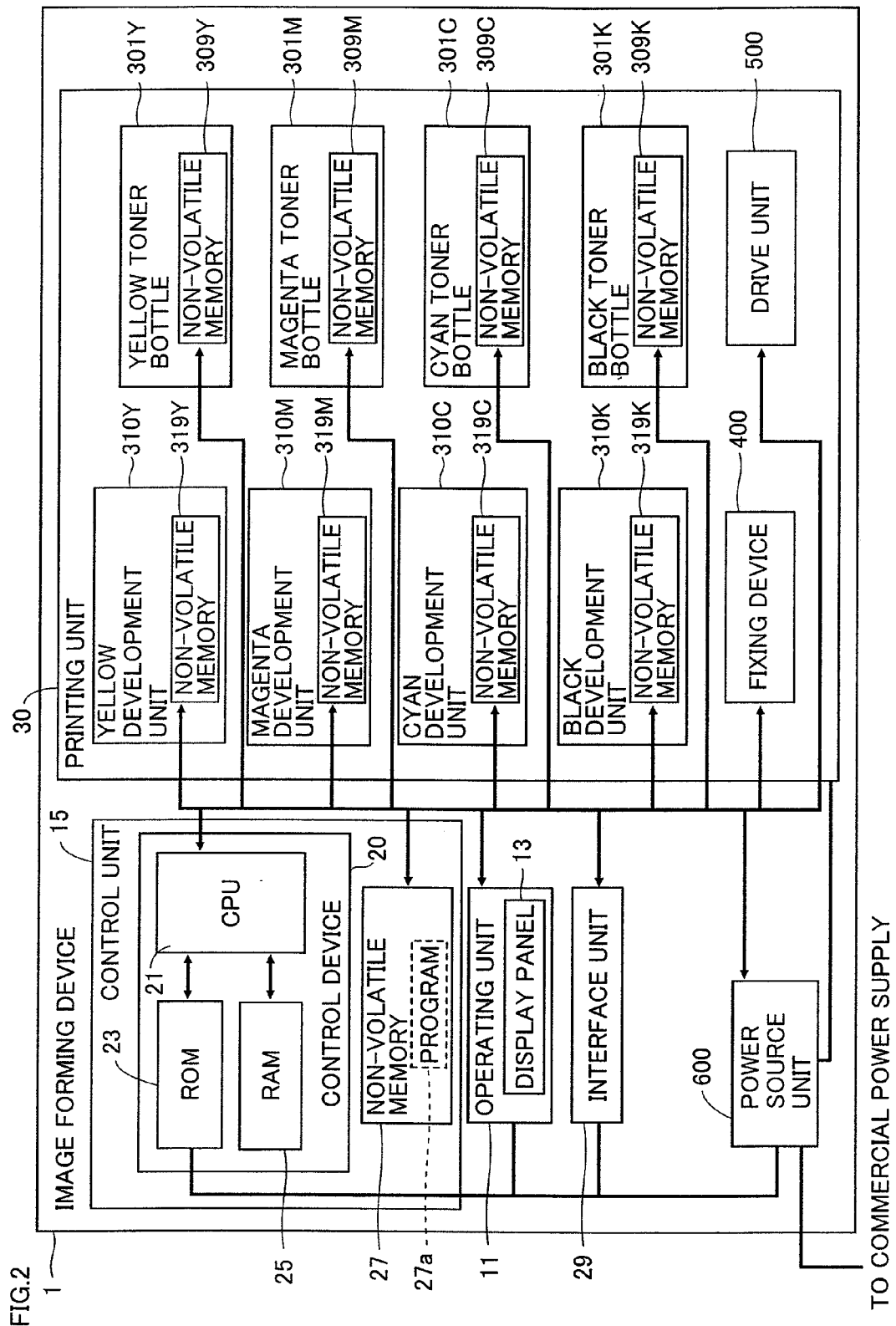
FIG. 2 is a block diagram showing the configuration of the image forming device.

FIG. 2 is a block diagram showing the configuration of image forming device 1.

Referring to FIG. 2, image forming device 1 further includes an operating unit 11, a control device 20, a non-volatile memory 27, an interface unit 29, and a power source unit (an example of an electric source power supplying unit) 600. Control device 20, non-volatile memory 27, and other components constitute a control unit 15.

Operating unit 11 is positioned on the housing of image forming device 1 so that a user can operate it. A display panel 13 is arranged on operating unit 11. Display panel 13 may be, for example, a liquid crystal display (LCD) that includes a touch panel. Display panel 13 displays a guidance screen to the user, or displays an operation button so that it can accept a touch operation by the user. Display panel 13 displays under the control of CPU 21 of control device 20. When display panel 13, an operation button (not shown), or the like is operated by the user, operating unit 11 sends a corresponding operation signal or a predetermined command to CPU 21. That is, the user can cause various operations in image forming device 1 by operating operating unit 11.

Control device 20 includes CPU 21, a read only memory (ROM) 23, a random access memory (RAM) 25, and other components. Control device 20 is connected to a system bus together with operating unit 11, non-volatile memory 27, interface unit 29, power source unit 600, and others. In this manner, control device 20 and the various components in image forming device 1 are connected such that they can transmit and receive signals to and from each other.

CPU 21 controls various operations in image forming device 1 by executing, e.g., a control program 27a stored in non-volatile memory 27. The control program may be stored in ROM 23, for example. When CPU 21 receives an operation signal from operating unit 11 or an operation command from a client PC or the like, CPU 21 executes a predetermined control program 27a in accordance with the signal or command. As such, a predetermined operation is carried out by image forming device 1 in accordance with a user operation of operating unit 11 or the like.

ROM 23 is a flash ROM (flash memory), for example. ROM 23 stores data used for operations in image forming device 1, function setting data for image forming device 1, and others. CPU 21 performs predetermined processing to read data from ROM 23 and write data into ROM 23. ROM 23 may be non-rewritable.

RAM 25 is a main memory for CPU 21. RAM 25 is used for storing data necessary for CPU 21 to execute control program 27a, as will be described later.

Non-volatile memory 27 may be an electrically erasable and programmable read only memory (EEPROM) or a flash ROM. Non-volatile memory 27 stores control program 27a for image forming device 1 to perform various operations. Non-volatile memory 27 for example stores data of a job which is received from the outside via interface unit 29. Non-volatile memory 27 may store a plurality of jobs transmitted from one client PC or a plurality of client PCs. Furthermore, non-volatile memory 27 backs up (i.e. stores) information which needs to be kept even after image forming device 1 is turned off. Non-volatile memory 27 stores operating information of image forming device 1, such as the total number of printed pages, the driving time of photoreceptor drum 311, and the like. These pieces of information are written therein and read therefrom by CPU 21. Non-volatile memory 27 may also store setting information for image forming device 1. Non-volatile memory 27 may be a hard disk drive (HDD), for example.

Interface unit 29 is constructed of, for example, hardware such as a network interface card (NIC) combined with software that communicates using a predetermined communication protocol. Interface unit 29 connects image forming device 1 to an external network such as a LAN. In this way, image forming device 1 is allowed to communicate with an external device, such as a client PC, connected to the external network. Image forming device 1 is capable of receiving a job from a client PC. Further, image forming device 1 is capable of sending image data to a client PC or send it in e-mail via a mail server. It should be noted that interface unit 29 may be configured to be capable of connecting to an external network via wireless communication. Further, interface unit 29 may be a universal serial bus (USB) interface, for example. In that case, interface unit 29 enables communication between an external device, connected to it via a communication cable, and image forming device 1.

Power source unit 600 is provided inside the housing of image forming device 1. Power source unit 600 is connected to the commercial power supply and supplies components of the device with electric power from the commercial power supply.

In the present embodiment, non-volatile memories 319Y, 319M, 319C, and 319K are provided in development units 310Y, 310M, 310C, and 310K, respectively. Further, non-volatile memories 309Y, 309M, 309C, and 309K are provided in toner bottles 301Y, 301M, 301C, and 301K, respectively. Each of non-volatile memories 319Y-319K and 309Y-309K may be, e.g., a customer specific integrated circuit (CSIC), from/to which CPU 21 is capable of reading/writing information.

Development unit 310 has a certain life, because photoreceptor drum 311 and the like in development unit 310 deteriorate as printing is repeated. Toner bottle 301, too, has a certain life, because toner stored in it decreases as printing is performed. In other words, development unit 310 and toner bottle 301 are consumable products (these may also be collectively referred to as consumable products 710). CPU 21 writes life information (an example of operating information; an example of information concerning control of a consumable product) corresponding to the life statuses of the respective consumable products into their non-volatile memories 319Y-319K and 309Y-309K (hereinafter, these may also be collectively referred to as non-volatile memories 719). This enables appropriate life management for each consumable product 710, as will be described later. Even in the case where consumable product 710 is detached from the image forming device and attached to another image forming device, the life management for the consumable product 710 can be continued in the other image forming device. This ensures accurate life management for each consumable product 710, thereby enabling appropriate image printing at all times.

Hereinafter, an example of the life management will be described. For example, for development unit 310, the driving time during which the images were formed is counted as the life information. Furthermore, for example for toner bottle 301, the number of sheets of paper on which the images were formed is counted as the life information. CPU 21 writes the counted life information into non-volatile memory 719 in that consumable product 710 (which is the backup process).

At this time, the life information is written whenever one job is finished, for example. This prevents further load from being applied to CPU 21 for writing the life information in the state where the load for executing the job is being applied to CPU 21. Thus, CPU 21 does not have to be an expensive one having a particularly high throughput. The time for writing the life information is not limited thereto; the information may be written at various times. For example, the writing may be performed every time a predetermined number of copies are printed, or once the data to be written becomes a predetermined size. The writing may also be performed at predetermined intervals.

CPU 21 compares the backed-up life information with a life reference value that has been defined in advance for that consumable product 710. If the life value that has been backed up exceeds the reference value, CPU 21 determines that the relevant development unit 310 has reached the end of its life. CPU 21 displays on display panel 13 a message to that effect or a message prompting replacement of consumable product 710 of which life has expired. It should be noted that the life information described above is not restrictive, but only illustrative.

As described above, according to image forming device 1, the life management may be performed to determine that consumable product 710 has reached an end of its life, to prevent a failure from occurring in image formation. For consumable product 710 of which life has expired, a user is prompted to perform maintenance work, such as replacement thereof. This improves usability of image forming device 1.

CPU 21 may be configured to notify a user in advance that the life of consumable product 710 will expire, so that the user can surely prepare for the maintenance work. When the life of consumable product 710 has expired, CPU 21 may suspend the image forming operation until the maintenance work is finished. CPU 21 may also back up the life information in non-volatile memory 27 provided in the device.

Figure 3:
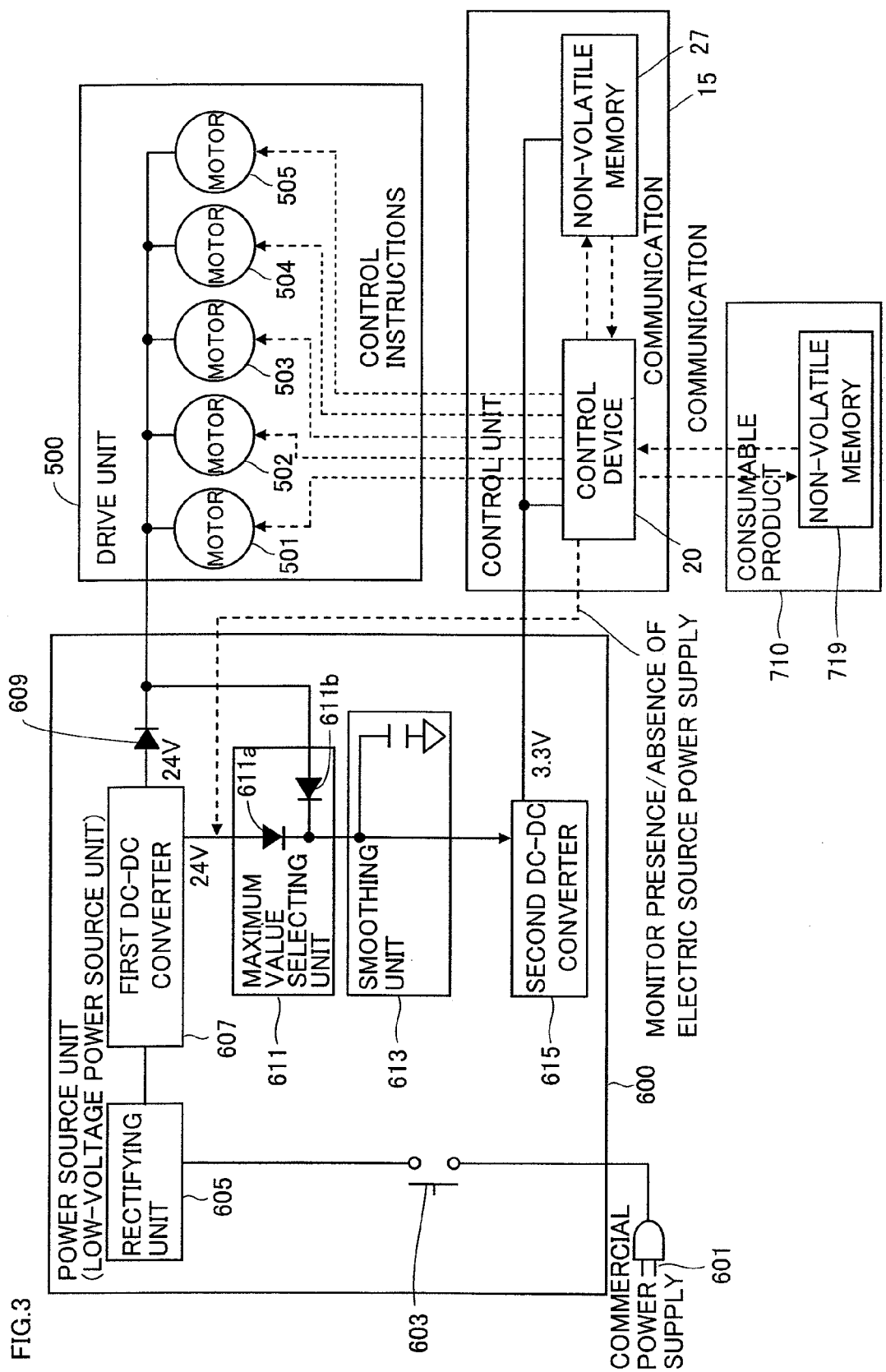
FIG. 3 is a block diagram showing the circuit configuration of a drive system in the image forming device, the drive system primarily including a power source unit and a drive unit.

FIG. 3 is a block diagram showing the circuit configuration of the drive system in image forming device 1, which primarily includes power source unit 600 and drive unit 500.

Power source unit (low-voltage power source unit) 600 is driven by commercial power supply which is supplied via power plug 601. Power source unit 600 includes a main power switch 603, a rectifying unit 605, a first DC-DC converter 607, a diode 609, a maximum value selecting unit (an example of a selecting unit) 611, a smoothing unit 613, and a second DC-DC converter 615. Main power switch 603 switches between on/off of input of AC power supply.

Rectifying unit 605 converts alternating current input from the commercial power supply to direct current. First DC-DC converter 607 converts the voltage of the direct current to obtain a stable low-voltage direct current. In the present embodiment, first DC-DC converter 607 outputs a voltage of 24 V DC. First DC-DC converter 607 outputs the DC voltage via diode 609 to drive unit 500. First DC-DC converter 607 also outputs a DC voltage to maximum value selecting unit 611. It should be noted that diode 609 is arranged such that, when regenerative electric power is generated in drive unit 500 as will be described later, the resultant current will not flow into first DC-DC converter 607. This prevents damages to first DC-DC converter 607.

In drive unit 500, motors 501-505 are each driven under the control instructions from CPU 21. Motors 501-505 are each driven by a voltage of 24 V DC output from first DC-DC converter 607.

Maximum value selecting unit 611 has two diodes 611a and 611b. Diode 611a is inserted in a path connected to first DC-DC converter 607, with its anode facing the first DC-DC converter 607 side. Diode 611b is inserted in a path connected to diode 609 and drive unit 500, with its anode facing the drive unit 500 side. Two diodes 611a and 611b are arranged in parallel, with their cathodes connected to each other.

Maximum value selecting unit 611 selects a higher one of the DC voltages at diodes 611a and 611b, and outputs it via smoothing unit 613 to second DC-DC converter 615. This ensures that, even in the case where electric power supply to motors 501-505 is cut off as will be described later, a relatively high voltage is stably supplied to second DC-DC converter 615. Accordingly, the electric power supply from second DC-DC converter 615 to control device 20 becomes more stable. Provision of diodes 611a and 611b also prevents a current from flowing reversely from one of diodes 611a and 611b that is higher in voltage level to the other that is lower in voltage level.

Smoothing unit 613 has a smoothing capacitor, and smoothes the pulsation of the direct current output from maximum value selecting unit 611. Second DC-DC converter 615 converts the DC voltage smoothed by smoothing unit 613, to obtain a stable current of a low voltage. In the present embodiment, second DC-DC converter 615 outputs a voltage of 3.3 V DC to control device 20 as signaling electric power supply. Second DC-DC converter 615 may be configured to output a voltage of 5 V DC, for example.

Control device 20 operates by a voltage of 3.3 V DC supplied from second DC-DC converter 615. In control device 20, CPU 21 communicates with ROM 23 or the like to read a control program therefrom or write data therein, for control of image forming device 1. CPU 21 communicates with non-volatile memory 27. CPU 21 also communicates with non-volatile memory 719 mounted on consumable product 710. CPU 21 backs up, in non-volatile memory 719, the information concerning the control of consumable product 710, such as the life information of consumable product 710, among the operating information inside image forming device 1.

In the present embodiment, CPU 21 monitors a voltage output from first DC-DC converter 607. That is, CPU 21 monitors presence/absence of power supply from the electric power source. For monitoring the status of electric power supply, the voltage output from first DC-DC converter 607 may be divided by a resistance, for example, to allow CPU 21 to detect the voltage. As a result, CPU 21 can detect the event that commercial power supply is stopped due to a power failure or the like, or the event that power supply from the electric power source is shut off as main power switch 603 is turned off CPU 21 may monitor the status of electric power supply in any other way.

Figure 4:
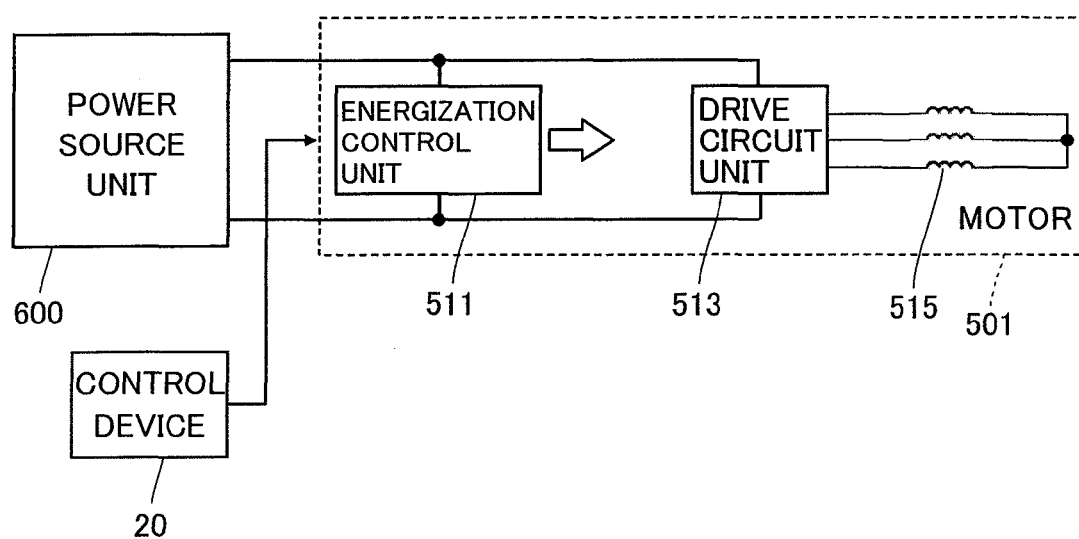
FIG. 4 is a block diagram showing a drive circuit in a motor.

FIG. 4 is a block diagram showing a drive circuit in motor 501.

Hereinafter, the drive circuit in motor 501 will be described with reference to FIG. 4. It should be noted that the drive circuits in the other motors 502-505 each have the configuration identical to that of motor 501.

Motor 501 is a DC motor. Motor 501 includes an energization control unit 511, a drive circuit unit 513, and winding 515. Power source unit 600 supplies a DC voltage to motor 501. The DC voltage from power source unit 600 is applied to energization control unit 511 and drive circuit unit 513. CPU 21 in control device 20 outputs control instructions, including a speed command, to energization control unit 511. As an example of the control instruction, when driving of motor 501 is instructed, energization control unit 511 in motor 501 causes drive circuit unit 513 to operate in accordance therewith. Drive circuit unit 513 provides winding 515 with the electric power supplied from power source unit 600, so as to generate motive power of motor 501. When stop of motor 501 is instructed, energization control unit 511 stops the supply of electric power from drive circuit unit 513 to winding 515, to thereby stop motor 501.

In the present embodiment, motor 501 is configured to allow for regenerative braking as a braking mode (i.e. braking method). The regenerative braking is effected when CPU 21 has set the braking mode to the regenerative braking mode. In the case where a deceleration instruction is received from CPU 21 while the regenerative braking mode is being set, energization control unit 511 controls drive circuit unit 513 to cause regenerative braking of motor 501. As the regenerative braking is conducted, the kinetic energy of motor 501 as well as that of the components which operate accompanying the rotation of motor 501 is converted into electrical energy (i.e. regenerative electric power) at winding 515. The regenerated electric power is supplied from drive circuit unit 513 to power source unit 600. It should be noted that the electric power for driving and the regenerative electric power may be supplied between power source unit 600 and motor 501 through a common line, or through separate lines dedicated respectively thereto.

The regenerative electric power generated in motor 501 and the like is supplied to control unit 15. Specifically, the regenerative electric power is passed through maximum value selecting unit 611 and through smoothing unit 613 where its peak value is controlled and its voltage is stabilized, before being input into second DC-DC converter 615. In second DC-DC converter 615, the input electric power is used to provide control unit 15 with the regenerative electric power of 3.3 V DC. The regenerative electric power is supplied to control unit 15 for a certain period of time after the cutoff of power supply from the electric power source. During the period in which the predetermined regenerative electric power is supplied to control unit 15, control device 20 and non-volatile memory 27 are driven by the regenerative electric power.

It should be noted that motor 501 is configured to be able to use other braking modes (i.e. stop methods) as well, such as a "short brake" mode and a "free run" mode. These braking modes are carried out as drive circuit unit 513 is controlled when a deceleration instruction is received in the state where the short brake mode or the free run mode has been set by CPU 21. The free run mode refers to the mode in which electric power supply to motor 501 is simply shut off to cause motor 501 to stop naturally. The short brake mode refers to the mode in which a closed circuit having only motor 501 is established and electric power supply to motor 501 is shut off. Motor 501 that keeps rotating due to inertia generates a counter electromotive force within the closed circuit, which force is used as a resistance for braking of motor 501. CPU 21 is configured to be able to select an appropriate braking mode in accordance with the situation. This enables braking of motor 501 and the like in accordance with the operating conditions of image forming device 1.

For braking control of motor 501 during a normal image forming operation, any of stop control in the free run mode, the short brake mode, and the regenerative braking mode may be adopted. With the regenerative braking mode or the short brake mode, the motor may be stopped quickly. With the free run mode, the motor may be kept operating longer than usual. Motor 501 may be configured such that it can be braked by yet another braking method, such as a reverse brake mode in which a current is forcibly flown in a reverse direction.

In the present embodiment, when electric power supply to image forming device 1 is cut off during the image forming operation, CPU 21 regeneratively brakes motors 501-505, and uses the regenerated electrical energy to back up the operating information. This operation will now be described.

Figure 5:
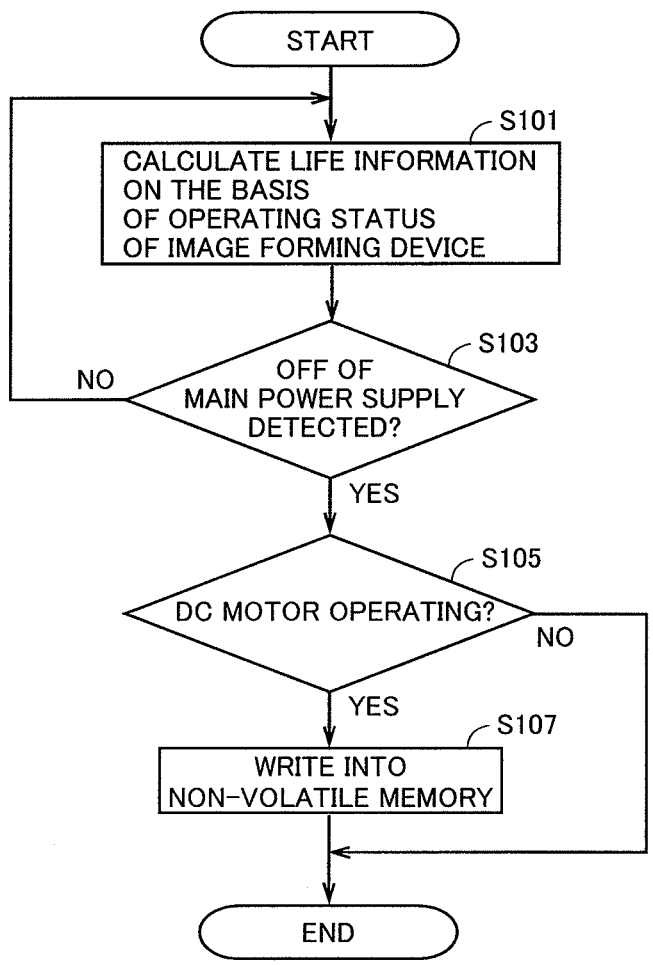
FIG. 5 is a flowchart illustrating a flow of the operations of the image forming device.

FIG. 5 is a flowchart illustrating a flow of the operations of image forming device 1.

In the state where main power switch 603 is on and electric power is supplied from the commercial power supply to power source unit 600 and, hence, image forming device 1 is being supplied with electric power, CPU 21 performs control as follows.

In step S101, CPU 21 calculates life information to be backed up, on the basis of the operating status of image forming device 1. For the calculated life information, CPU 21 performs a backup process at a predetermined time, for example upon completion of one job, as described above. The calculated life information is held in RAM 25, for example, until the backup process is performed.

In step S103, CPU 21 detects whether the main power supply for image forming device 1 is off. Specifically, CPU 21 detects whether electric power is no longer supplied to motors 501-505. To this end, the voltage output from first DC-DC converter 607 is monitored, as described above. If the main power supply is not off, CPU 21 continues the process in step S101.

If it is detected in step S103 that the main power supply is off, in step S105, CPU 21 detects whether at least one of motors 501-505 is operating. In the case where at least one of motors 501-505 is operating, the backup process may be performed by obtaining regenerative electric power from the motor in operation. If none of motors 501-505 is operating, CPU 21 exits the control program for image forming device 1, if possible, before finishing the operation.

If it is detected in step S105 that at least one of motors 501-505 is operating, in step S107, CPU 21 backs up (i.e. writes) the calculated life information into non-volatile memory 719 or the like. At this time, CPU 21 sets the braking mode of motors 501-505 to the regenerative braking mode, as described above. CPU 21 issues to energization control unit 511 a speed instruction to decelerate and stop. As a result, regenerative braking is effected in motors 501-505, where the accumulated kinetic energy is converted into electric power, and the regenerative electric power is output. Although the deceleration curve of motors 501-505 at this time is preferably the one that can obtain more regenerative electric power, any deceleration curve may be used for braking. The electric power regenerated in motors 501-505 is supplied to control unit 15, as described above. This allows CPU 21 to use the provided regenerative electric power to perform the backup process.

It should be noted that CPU 21 may perform the backup process on the condition that at least a predetermined number of motors among motors 501-505 are operating, or on the condition that a predetermined one of motors 501-505 is operating. For example, CPU 21 may be configured such that it performs the backup process by obtaining the regenerative electric power provided that the above condition is satisfied in step S105; otherwise, it terminates the operation.

As described above, in the first embodiment, when the electric power supply is cut off during printing, CPU 21 regeneratively brakes motors 501-505, and carries out the backup process by using the regenerated electric power. This ensures that, even if the electric power supply is cut off during printing, the operating information being backed up is substantially identical to the actual operating information, with almost no discrepancy therebetween. Accordingly, the life can be managed reliably, without the need to frequently update the life information. Consumable product 710 or the like is prevented from being used beyond its life, whereby proper image formation is ensured. Furthermore, the backup process may be carried out reliably without the need to provide a backup power source such as a battery, which can reduce the manufacturing cost of image forming device 1.

CPU 21 continually calculates the life information of image forming device 1 to be written in the backup process. As a result, the process of writing the information into non-volatile memory 719 may be carried out immediately after cutoff of power supply from the electric power source. This ensures that the backup process can be performed even when the regenerative electric power obtained is small in amount.

Alternatively, CPU 21 may be configured to start calculating the information to be written into non-volatile memory 719 or the like at the time when the backup process is performed, and to back up the calculated information. Furthermore, in the case where there is definitely no need to perform the backup process, as in the case where the electric power supply is cut off shortly after start of the image forming operation, CPU 21 may control the motors in the short brake mode, free run mode, or other braking mode, rather than causing regenerative braking.

Still further, CPU 21 may use, as the operating information for use in life management of consumable product 710, the information backed up in non-volatile memory 27 which is provided in image forming device 1.

[Second Embodiment]

In the image forming device according to a second embodiment, the backup process which is performed by CPU 21 while electric power is being supplied from the electric power source is different from the one in the first embodiment. Otherwise, the basic configuration is identical to that of the first embodiment. In the following, the elements similar to those in the first embodiment are denoted by like reference characters, and description thereof will not be repeated.

Figure 6:
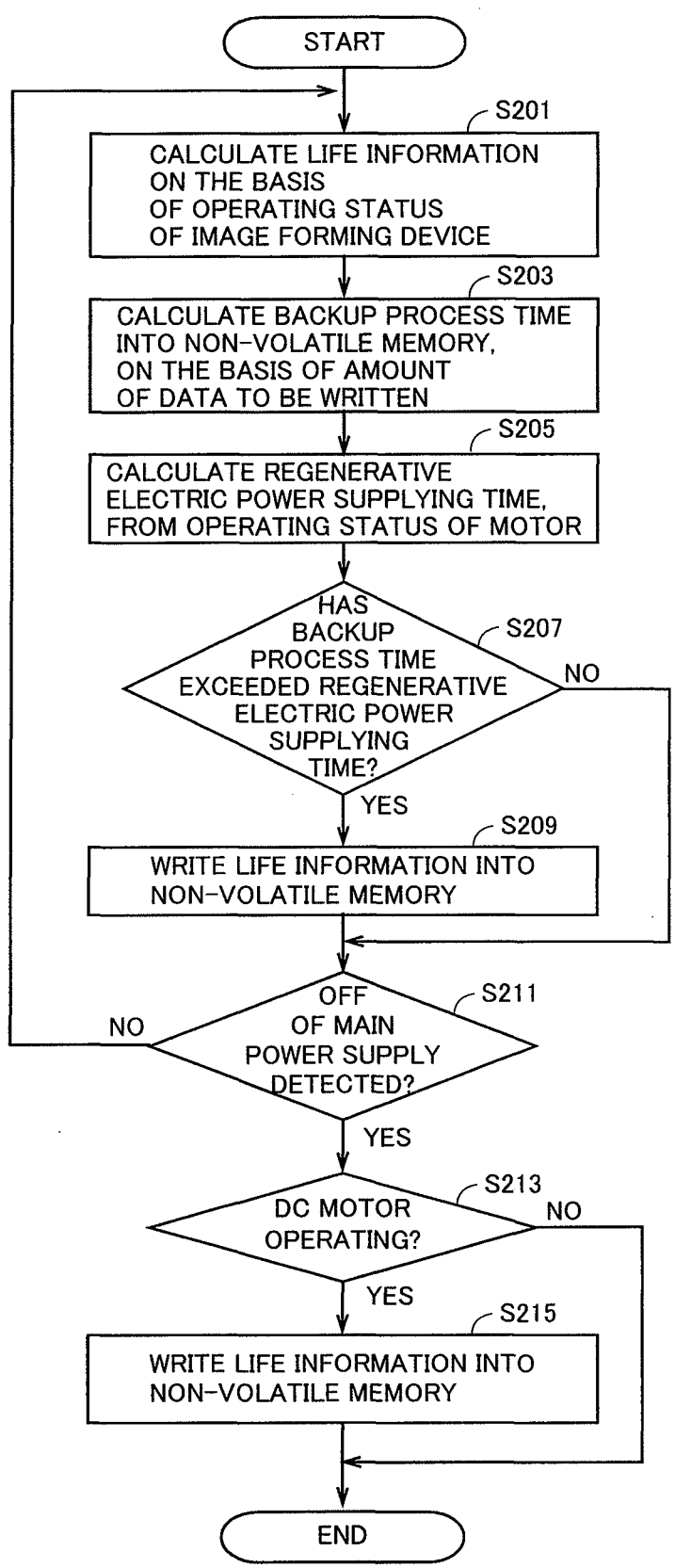
FIG. 6 is a flowchart illustrating a flow of the operations of the image forming device according to a second embodiment.

FIG. 6 is a flowchart illustrating a flow of the operations of the image forming device according to the second embodiment.

In the state where electric power is supplied from the commercial power supply to power source unit 600 and, hence, image forming device 1 is supplied with electric power, CPU 21 performs control as follows.

Referring to FIG. 6, in step S201, CPU 21 calculates life information which has to be written, on the basis of the operating status of image forming device 1. The calculated life information is held in RAM 25, for example.

In step S203, CPU 21 calculates a backup process time which is necessary for the calculated life information to be written into non-volatile memory 719.

In step S205, CPU 21 calculates a regenerative electric power supplying time on the basis of the operating statuses of motors 501-505, which may be the number of motors among motors 501-505 which are running, the rotational speeds (numbers of revolutions) of motors 501-505, and others. The regenerative electric power supplying time refers to the time during which electric power can be supplied to control device 20 in the case where motors 501-505 are braked in the regenerative braking mode. As the number of motors among motors 501-505 which are operating increases, the regenerative electric power supplying time calculated becomes longer. As the number of revolutions of the motor in operation is higher, the regenerative electric power supplying time calculated becomes longer. The regenerative electric power supplying time is calculated for example in the following manner. For each of motors 501-505, information about correlation between the number of revolutions when operating or the like and the time during which a predetermined amount of regenerative electric power can be obtained by regenerative braking is registered in advance in non-volatile memory 27 or the like. The predetermined amount of regenerative electric power refers to the regenerative electric power necessary for driving control device 20. At this time, preferably, the case of conducting regenerative braking so as to obtain the predetermined amount of regenerative electric power is assumed. CPU 21 refers to the correlation information to calculate the regenerative electric power supplying time in accordance with the driving information of each of motors 501-505.

In step S207, CPU 21 determines whether the backup process time calculated in step S203 has exceeded the regenerative electric power supplying time calculated in step S205.

If it is determined in step S207 that the backup process time has exceeded the regenerative electric power supplying time, in step S209, CPU 21 writes (i.e. backs up) the life information calculated in step S201 into non-volatile memory 719. At this time, CPU 21 backs up the calculated life information until when the backup process time becomes at least equal to or less than the regenerative electric power supplying time. For example, CPU 21 may back up all the life information calculated to that time point, so as to cause the backup process time to temporarily become zero. Alternatively, it may back up part of the calculated life information. In this case, it may back up part of the life information for each of all consumable products 710, or back up a whole of the life information for one or more of consumable products 710.

If it is determined in step S207 that the backup process time has not exceeded the regenerative electric power supplying time, or when the backup process has been performed in step S209, CPU 21 detects in step S211 whether the main power supply of image forming device 1 is off. This detection is performed in a similar manner as in step S103 in the first embodiment described above. If the main power supply is not off, CPU 21 continues the processes in steps S201 to S209.

The operations in steps S213 and S215, i.e. the operations performed by CPU 21 after it detects cutoff of power supply from the electric power source, are similar to those in steps S105 and S107. That is, CPU 21 detects whether motors 501-505 are operating (S213). If none of motors 501-505 is operating, CPU 21 terminates the operations. If any of motors 501-505 is operating, CPU 21 backs up the calculated life information into non-volatile memory 719 or the like (S215).

As described above, in the second embodiment, it may be controlled such that the backup process time does not exceed the regenerative electric power supplying time. Therefore, even in the case where electric power supply to image forming device 1 is cut off, the supply of the regenerative electric power is not stopped during the life information writing process. This ensures that, even in the case where a large amount of life information needs to be backed up, the regenerative electric power may be used to write all the life information when the electric power supply to image forming device 1 is cut off. As a result, the life management can be carried out reliably, thereby ensuring proper image formation.

[Third Embodiment]

In the image forming device according to a third embodiment, the configuration of the toner image forming unit differs from that of the first embodiment. Otherwise, the basic configuration and the operations performed when power supply from the electric power source is cut off are similar to those in the first embodiment. In the following, the elements similar to those in the first embodiment are denoted by like reference characters, and description thereof will not be repeated.

Figure 7:
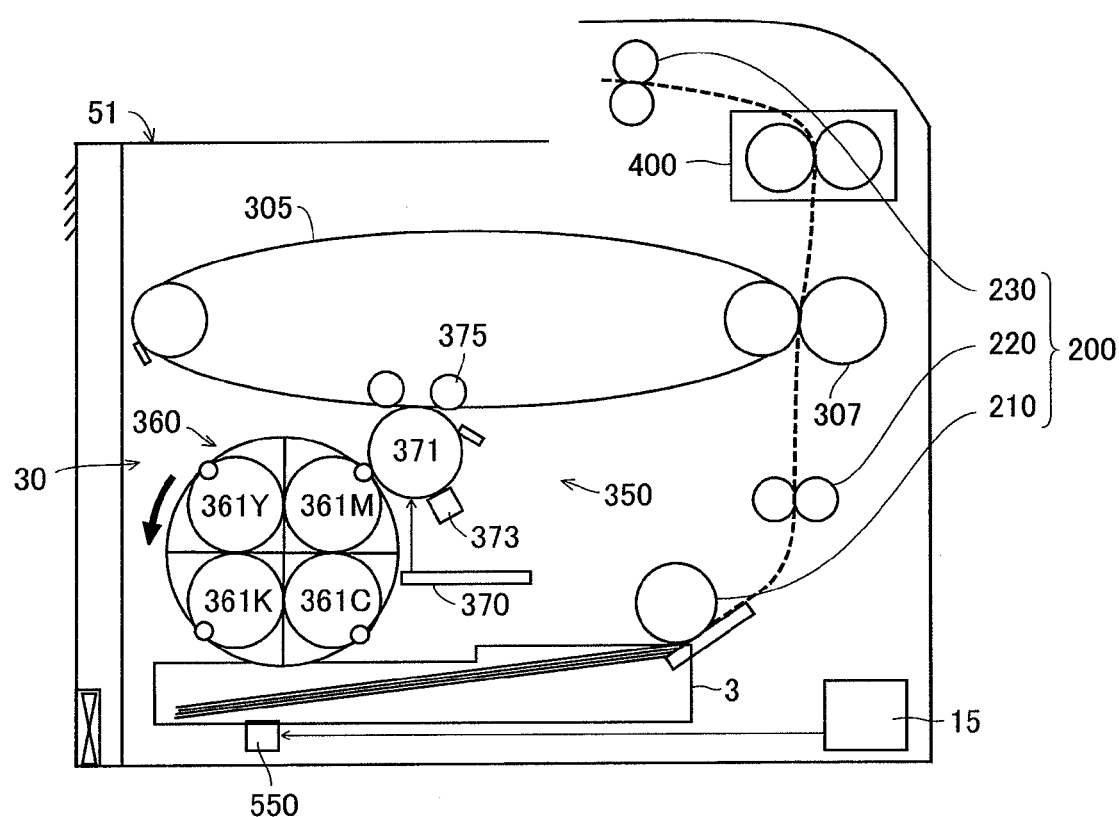
FIG. 7 is a side view showing the hardware configuration of the image forming device according to a third embodiment.
Figure 8:
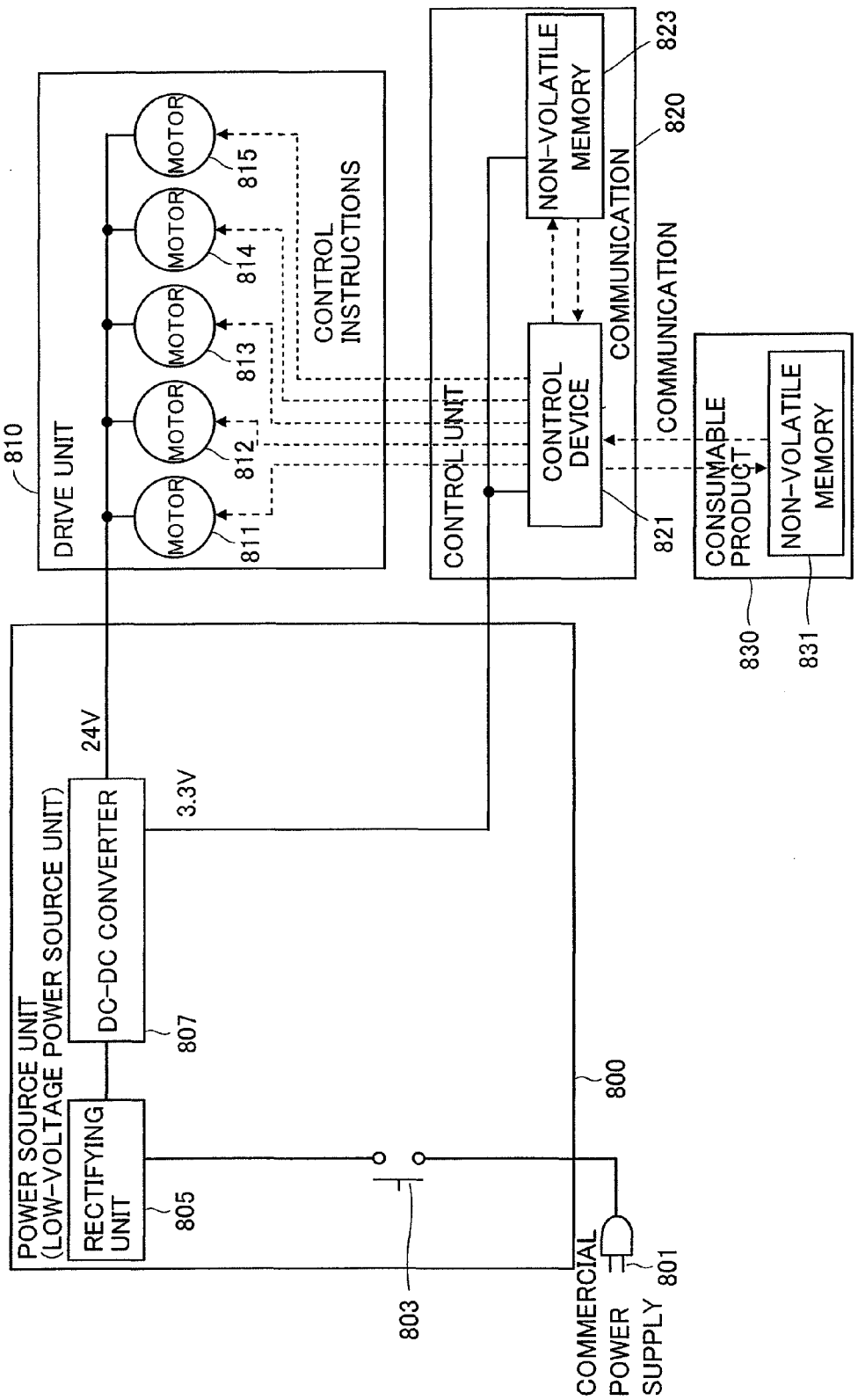
FIG. 8 is a block diagram showing, by way of example, the circuit configuration of a drive system in a conventional image forming device.

FIG. 7 is a side view showing the hardware configuration of the image forming device according to the third embodiment.

An image forming device 51 is a so-called "four cycle machine". A toner image forming unit 350 in image forming device 51 includes a development rack unit 360, a photoreceptor drum 371, an intermediate transfer belt 305, a transfer roller 307, and other components. Photoreceptor drum 371 is arranged in proximity to intermediate transfer belt 305 and development rack unit 360. An electrifying device 373, an opposite roller 375, a laser scanning unit 370, and other components are arranged surrounding photoreceptor drum 371. Electrifying device 373 electrifies photoreceptor drum 371. Laser scanning unit 370 exposes an image pattern onto photoreceptor drum 371 to form a latent image. Opposite roller 375 is arranged so as to sandwich intermediate transfer belt 305 between photoreceptor drum 371 and opposite roller 375, and performs primary transfer of the toner image formed on photoreceptor drum 371.

Four cartridges (developing devices) 361C, 361M, 361Y, and 361K corresponding to colors C, M, Y, and K (also referred to as cartridges 361) can be mounted on development rack unit 360. Each cartridge 361 is composed of toner, a developing roller that uses that toner for development, and other components.

Development rack unit 360 is rotatable. During image forming, CPU 21 causes development rack unit 360 to be rotated to form (i.e. develop) a toner image on photoreceptor drum 371 on which a latent image has been formed. For each of colors Y, M, C, and K, photoreceptor drum 371 is electrified, exposed to light, and used for development, one color after another, so that the formed toner image is transferred to intermediate transfer belt 305 using opposite roller 375. After toner images in four different colors are superimposed on each other on intermediate transfer belt 305, the sheet is pressed by transfer roller 307 to perform the secondary transfer of the formed toner image. The sheet with the transferred toner image undergoes the fixing step at fixing device 400 before being discharged by discharge roller 230.

Drive unit 500 of image forming device 51 has a rack drive motor (an example of a motor) 550 to rotationally drive development rack unit 360. CPU 21 controls the rotation of rack drive motor 550 to control the rotational drive of development rack unit 360.

In the third embodiment, when power supply from the electric power source is cut off, the regenerative braking is carried out as in the first embodiment described above. The regenerative braking is performed for example in rack drive motor 550 as well. Rack drive motor 550, when operating, rotates development rack unit 360 which is relatively heavy in weight. This means that rack drive motor 550 and development rack unit 360 both have large kinetic energy when operating. In the case where rack drive motor 550 is in operation when the power supply from the electric power source to image forming device 51 is cut off, CPU 21 can obtain a large amount of regenerative electric power from rack drive motor 550.

As described above, CPU 21 is configured to regeneratively brake the motor which cooperates with the member that is large in size and produces large kinetic energy when operating, whereby a larger amount of regenerative electric power can be generated for a long period of time. As a result, control device 20 can be driven for a longer period of time, ensuring reliable backup of the life information.

It should be noted that, when power supply from the electric power source is cut off, CPU 21 may perform regenerative braking in a similar manner as in the second embodiment described above. In this case, the regenerative electric power supplying time is elongated, which can reduce the number of times of performing the backup process in preparation for cutoff of the electric power supply, whereby the load on CPU 21 can be reduced.

[Effects Of The Embodiments]

In each of the image forming devices configured as described above, in the case where electric power supply from the power source unit is stopped, the CPU regeneratively brakes the motors. The regenerated electric power is used for driving the CPU to cause it to perform the backup process. This can prevent discrepancy between the information which has been backed up and the actual life status. As a result, the state where an image can be formed properly is maintained constantly, and the manufacturing cost of the consumable products can be reduced.

Furthermore, it is unnecessary to frequently perform the backup process during the image forming operation as in the conventional art, whereby the processing load on the CPU can be reduced. Consequently, it is unnecessary to use a CPU of high performance, so that the manufacturing cost of the image forming device can be reduced.

[Other Backup Process]

The backup process is not restricted to the one that is performed in relation to the life management as in the first through third embodiments described above. The backup process may be performed in relation to control of the printing unit, in addition to or in place of the life management, for example in relation to an image stabilizing function that is periodically performed in the printing unit. Hereinafter, an example of the backup process performed in relation to the image stabilizing function in image forming device 1 of the first embodiment will be described.

For example, when a large number of images are formed in an image forming device, color density in the images may gradually vary and/or superposition of the images may gradually go wrong. The image stabilizing function is performed periodically to avoid these problems. According to the image stabilizing function, for example, CPU 21 forms a test pattern on a sheet of paper for evaluation. Thereafter, CPU 21 controls printing unit 30 in accordance with a result of evaluation of the test pattern. Specifically, calibration of printing unit 30 is carried out by the image stabilizing function, to ensure proper image formation.

CPU 21 for example counts the number of printouts by image forming device 1 and uses the count value (an example of information concerning control of a printing unit) as the operating information to be backed up in non-volatile memory 27. The information may be backed up at a predetermined time, as described above. When the operating information that has been backed up exceeds a predetermined reference value for the count value (5000, for example), CPU 21 carries out the image stabilizing function. At this time, CPU 21 clears the operating information. This enables image forming device 1 to be automatically kept in the state where it can form proper images all the time.

If power supply from the electric power source to image forming device 1 is cut off during the image forming operation, CPU 21 uses the regenerative electric power to perform the backup process, in such a manner as described above. That is, CPU 21 operates by the regenerative electric power obtained from motors 501-505, to thereby update the operating information in non-volatile memory 27. As a result, the operating information being backed up is kept approximately the same as the actual operating information, whereby image forming device 1 can be kept in the state where it can form proper images all the time.

[Others]

The CPU may be configured to cause regenerative braking in only a particular motor, and use the regenerated electric power to perform the backup process.

Furthermore, the motor may be braked regeneratively, not only when the power supply from the electric power source is cut off, but also when the image forming device is stopped due to another reason, to enable the backup process using the regenerative electric power. For example, in the case where paper jam occurs in the paper transport unit, or in the case where the fixing device suffers a temperature error, the backup process can be performed. This enables effective use of energy to thereby reduce the consumed electric power. The backup process may be carried out whenever possible, with a less load applied on CPU 21, whereby the life management can be performed reliably.

The image forming device may be any of black-and-white or color copier, printer, facsimile machine, and the like. The image forming device may be a multi function peripheral (MFP) provided with the scanner function, the copying function, the function as a printer, the facsimile transmitting/receiving function, the data communicating function, and the server function. With the scanner function, the MFP reads an image from a document that has been set, and stores it in a HDD or the like. With the copying function, it prints the image on a sheet of paper or the like. With the function as a printer, it receives a printing instruction from an external terminal such as a PC and performs printing on a sheet of paper based on the instruction. With the facsimile transmitting/receiving function, it receives facsimile data from an external facsimile machine or the like and stores the data in the HDD or the like. With the data communicating function, it transmits data to and receives data from an external device connected thereto. With the server function, it allows a plurality of users to share, e.g., the data stored in the HDD or the like.

Furthermore, the image forming device is not limited to the one which forms an image on a sheet of paper while transporting the sheet. It may be a pen plotter or a similar one which forms an image by moving a recording unit with respect to a sheet of paper that is fixed in place. In this case, regenerative electric power re-generated by the motor that drives the recording unit may be used to perform the backup process, to ensure life management of an ink level and others.

The processing in the above embodiments may be performed by software, or by using hardware circuits.

A program for executing the processing in the above embodiments may also be provided. The program may be recorded on a recording medium so as to be provided to a user. The recording medium may be any of a CD-ROM, a flexible disk, a hard disk, a ROM, a RAM, a memory card, and others. The program may also be downloaded to the device via a communication line such as the Internet. The processing described above in conjunction with the flowcharts is carried out by the CPU and the like in accordance with the program.

According to the embodiments described above, even in the case where electric power supply from an electric source power supplying unit is stopped, regenerative electric power may be used to write operating information into a non-volatile memory. As a result, it is possible to provide the image forming device which can surely manage the operating information even when electric power supply is cut off during printing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming device, comprising:
    at least one motor;
    a non-volatile memory into which information can be written;
    a writing unit to write into said non-volatile memory operating information within the image forming device at a predetermined time;
    an electric source power supplying unit to supply electric power to said writing unit, the electric power being supplied from an electric power source;
    a regenerative unit to take regenerative electric power out of said motor, the regenerative electric power being generated until said motor stops;
    a regenerative electric power supplying unit, when electric power supply from said electric source power supplying unit is stopped, to supply the regenerative electric power taken out of said motor by said regenerative unit to said writing unit, so as to cause said writing unit to perform writing into said non-volatile memory using the regenerative electric power;
    a first calculating unit to calculate a backup process time required for said writing unit to write all necessary information into said non-volatile memory;
    and a second calculating unit to calculate, on the basis of a driving status of said motor, an electric power supplying time during which said regenerative electric power supplying unit is capable of supplying electric power to said writing unit, wherein in the case where the backup process time calculated by said first calculating unit exceeds the electric power supplying time calculated by said second calculating unit, said writing unit performs writing into said non-volatile memory at least until said backup process time becomes not greater than said electric power supplying time.

2. The image forming device according to claim 1, wherein said non-volatile memory is mounted on a consumable product, the consumable product being set in and used by said image forming device, and
    said writing unit backs up, in said non-volatile memory, information concerning control of said consumable product.

3. The image forming device according to claim 1, wherein said non-volatile memory is mounted within said image forming device, and
    said writing unit backs up, in said non-volatile memory, information concerning control of a printing unit for forming an image.

4. The image forming device according to claim 1, wherein selection of either electric power supply from said electric source power supplying unit to said writing unit or electric power supply from said regenerative electric power supplying unit to said writing unit is made by a selecting unit having a maximum value selecting circuit.

5. The image forming device according to claim 1, wherein when electric power supply from said electric source power supplying unit is stopped in the state where at least one of said motors is operating, said regenerative electric power supplying unit causes said writing unit to perform writing into said non-volatile memory.

6. The image forming device according to claim 1, further comprising a third calculating unit to continually calculate, on the basis of a control status of said image forming device, information to be written into said non-volatile memory by said writing unit, wherein
    said writing unit, at the time of writing into said non-volatile memory, writes the information calculated by said third calculating unit.

7. The image forming device according to claim 1, wherein at least one of a sheet of paper placed on a paper feed tray and a recording unit for forming an image is moved so as to form an image on the sheet of paper.

8. A method for controlling an image forming device, the image forming device including
    at least one motor, a non-volatile memory into which information can be written, and
a writing unit to write into said non-volatile memory operating information within the image forming device at a predetermined time,
an electric source power supplying unit to supply electric power supplied from an electric power source to said writing unit,
the method comprising the steps of:
taking regenerative electric power out of said motor, the regenerative electric power being generated until said motor stops; and
when electric power supply from said electric source power supplying unit is stopped, supplying the regenerative electric power, taken out of said motor in said step of taking regenerative electric power, to said writing unit, so as to cause said writing unit to perform writing into said nonvolatile memory using the regenerative electric power;
calculating a backup process time required for said writing unit to write all necessary information into said non-volatile memory;
calculating, on the basis of a driving status of said motor, an electric power supplying time during which electric power can be supplied to said writing unit in said step of supplying the regenerative electric power;
and in the case where the backup process time calculated in said step of calculating a backup process time exceeds the electric power supplying time calculated in said step of calculating an electric power supplying time, performing writing into said non-volatile memory, by said writing unit, at least until said backup process time becomes not greater than said electric power supplying time.

9. The method for controlling an image forming device according to claim 8, further comprising the step of selecting, by a selecting unit having a maximum value selecting circuit, either electric power supply from said electric source power supplying unit to said writing unit or electric power supply in said step of supplying the regenerative electric power to said writing unit.

10. The method for controlling an image forming device according to claim 8, further comprising the steps of:
continually calculating, on the basis of a control status of said image forming device, information to be written into said non-volatile memory by said writing unit; and
writing into said non-volatile memory, by said writing unit, the information calculated in said step of continually calculating information.

11. A non-transitory computer readable medium on which a program is stored, the program for controlling an image forming device,
the image forming device including
at least one motor,
a non-volatile memory into which information can be written,
a writing unit to write into said non-volatile memory operating information within the image forming device at a predetermined time, and an electric source power supplying unit to supply electric power supplied from an electric power source to said writing unit,
the program being stored in a computer readable medium and causing a computer to execute processing comprising the steps of:
taking regenerative electric power out of said motor, the regenerative electric power being generated until said motor stops;
when electric power supply from said electric source power supplying unit is stopped, supplying the regenerative electric power, taken out of said motor in said step of taking regenerative electric power, to said writing unit, so as to cause said writing unit to perform writing into said nonvolatile memory using the regenerative electric power;
calculating a backup process time required for said writing unit to write all necessary information into said non-volatile memory;
calculating, on the basis of a driving status of said motor, an electric power supplying time during which electric power can be supplied to said writing unit in said step of supplying the regenerative electric power;
and in the case where the backup process time calculated in said step of calculating a backup process time exceeds the electric power supplying time calculated in said step of calculating an electric power supplying time, performing writing into said non-volatile memory, by said writing unit, at least until said backup process time becomes not greater than said electric power supplying time.

12. The program stored on the non-transitory computer readable medium for controlling an image forming device according to claim 11, causing the computer to execute the processing further comprising the step of selecting, by a selecting unit having a maximum value selecting circuit, either electric power supply from said electric source power supplying unit to said writing unit or electric power supply in said step of supplying the regenerative electric power to said writing unit.

13. The program stored on the non-transitory computer readable medium for controlling an image forming device according to claim 11, causing the computer to execute the processing further comprising the steps of:
continually calculating, on the basis of a control status of said image forming device, information to be written into said non-volatile memory by said writing unit; and
writing into said non-volatile memory, by said writing unit, the information calculated in said step of continually calculating information.

* * * * *